United States Patent [19]
Golob et al.

[11] Patent Number: 5,574,253
[45] Date of Patent: Nov. 12, 1996

[54] HOUSING FOR AN ELECTRICALLY POWERED APPLIANCE FOR PERSONAL USE

[75] Inventors: Jürgen Golob, Friedrichsdorf, Germany; Antonio Rebordosa, Manresa, Spain

[73] Assignee: Braun Aktiengesellschaft, Kronberg, Germany

[21] Appl. No.: 390,036

[22] Filed: Feb. 17, 1995

[30] Foreign Application Priority Data

Feb. 23, 1994 [DE] Germany .......................... 44 05 765.2

[51] Int. Cl.⁶ .............................. H05K 5/00; A45C 11/26
[52] U.S. Cl. .......................... 174/52.1; 206/349; 206/351
[58] Field of Search .................... 174/52.1; 206/351, 206/320, 349; 222/400.5, 410

[56] References Cited

U.S. PATENT DOCUMENTS

| | | | |
|---|---|---|---|
| 3,980,909 | 9/1976 | Klein | 310/50 |
| 4,251,915 | 2/1981 | Ullmann | 30/43.92 |
| 4,388,509 | 6/1993 | Ullmann et al. | 200/157 |
| 4,468,554 | 8/1984 | Andis | 219/222 |
| 5,087,143 | 2/1992 | Hertrampf | 401/146 |
| 5,247,218 | 9/1993 | Sven . | |
| 5,339,479 | 8/1994 | Lyman | 15/105 |

FOREIGN PATENT DOCUMENTS

| | | |
|---|---|---|
| 2 195 102 | 3/1974 | France . |
| 17 90 734 | 6/1959 | Germany . |
| 27 39 137 | 3/1979 | Germany . |
| 426 145 | 6/1967 | Switzerland . |
| 2 020 216 | 11/1979 | United Kingdom . |
| 2 116 154 | 9/1983 | United Kingdom . |

OTHER PUBLICATIONS

Pye, "High–Grip Finish Achieved by Co–Injection Moulding." Design Engineering, 232:19 (1983).

Database WPI: Week 8706, Derwent Publications Ltd., London GB; AN 87–040890 & JP–A–62 000 340 (Molten, KK Forbray KK), Jan. 6, 1987.

Database WPI: Week 8735, Derwent Publications Ltd., London GB; AN 87–245809 & JP–A–62 167 048 (Showa Denko KK), Jul. 23, 1987.

Database WPI: Week 8644, Derwent Publications Ltd., London GB; AN 86–289272 & JP–A–61 213 145 (Shiina F) Sep. 22, 1986.

*Primary Examiner*—Bot L. Ledynh
*Attorney, Agent, or Firm*—Fish & Richardson, P.C.

[57] ABSTRACT

A housing of a hand-held blender includes a wall fabricated from a first plastic material having at least one outer surface. The housing is further provided in at least one area with at least one second plastic material whose hardness is lower than the hardness of the first plastic material. The second plastic material is molded onto the inner surface of the wall by injection molding, such that a first area of the at least one area projects from the inner surface of the wall at least in individual sections, forming bearing areas. These bearing areas serve as supports for drive, control and switching devices. With this arrangement, the housing affords particular ease of manufacture while at the same time performing a damping function, improving the manipulation and reducing the noise level of a hand-held mixer while in operation.

14 Claims, 1 Drawing Sheet

HOUSING FOR AN ELECTRICALLY POWERED APPLIANCE FOR PERSONAL USE

This invention relates to a housing for an electrically powered appliance for personal use, such as a toothbrush, a shaving apparatus, a kitchen appliance or food processor and the like, for accommodating drive, control and switching means, which housing is fabricated from a first plastic material having at least one outer surface and one inner surface, and is provided in at least one area with at least one second plastic material of a hardness lower than the hardness of the first plastic material.

Housings of this type are known in the art and are utilized in particular as housing walls for appliances for personal use, such as electric shavers, film cameras, electric toothbrushes or the like. For example, DE-A-27 39 137 describes a perforated housing wall in which a foil is affixed to the inner surface of the housing wall as by adhesive bonding, this foil or plate being made of a plastic material or some other rubber-like material as, for example, elastomer. One side of the foil is provided with a plurality of knobs or tongue-type protections protruding from a surface area of the foil or plate and arranged in respect of position, number and size such as to extend through the perforations in the housing wall, projecting a small amount from the outer surface of the housing.

In such an arrangement, the perforated housing wall is an injection-molded plastic part fabricated from a plastic material having properties other than the plastic material of the foil or the plate. Although housings of this type have largely established themselves in practical use, manufacturing effort and manufacturing cost of such housings which are preferably mass-produced articles are very high.

Also, the injection molds necessary for the manufacture of such housings are elaborate and expensive.

Further, from DE-A-43 06 588 a vibration-damping mounting structure for an electric motor in a housing is known, in which the mounting function is performed by damping means slipped onto mounting brackets. These damping means are comprised of separately manufactured rubber parts requiring the step of being slip-fitted to the motor housing in a comparatively complex assembly operation.

It is an object of the present invention to devise a housing for an electrically powered appliance for personal use which can be manufactured with particular ease at low manufacturing cost while allowing a wide variability of design, and in which further components are centrally located, held and installed on anti-vibration mountings in a simple manner without involving the need for additional components adapted to be fitted into the housing.

This object is solved with the features of patent claim 1. According to the present invention, after the housing is molded from a first plastic material, it is placed in a second mold in which a second plastic material of a hardness lower than that of the first plastic material is injection-molded over those areas on the housing which later serve as bearing areas, as frictional engagement areas, or as tight supports for components to be subsequently mounted in the housing. By virtue of this simple housing manufacture, these components are carried in the housing in a damping and clearance-free manner, the components being dimensioned such as to be urged against the outer surface of the bearing areas with some bias. Owing to their elastic mounting, the components are installed in the housing on anti-vibration mountings and are centrally located therein, without the need to provide additional fastening means. This is an advantage in particular when the housing is of an essentially circular cylindrical cross-section through the opening of which the components are inserted and are biased by the elastic second plastic material such as to be fixedly held in the housing with vibration-absorbing effect. The second plastic material within the meaning of the present invention is understood to mean that also various plastic materials differing in hardness, color, etc. may be injection-molded onto the first plastic material of the housing, in which event, however, the various areas are not interconnected.

The bearing areas and their connecting areas may serve an added sound-insulating function, or alternatively, they may act as a light screen to prevent signal lamps provided in the housing from shining through the housing adjacent to the viewing window. Also, these areas may serve as a spring means for elastically supporting components mounted in the interior of the housing. This provides the appliance with an increased impact strength, enables tolerances and thermal expansion to be compensated for, and reduces the transmission of vibration. The individual areas on the outer surface on which the second plastic material is provided are interconnected through the apertures and the connecting areas provided on the inner surface which are equally provided with the second plastic material, thus enabling the areas and connecting areas to be provided with the second plastic material by means of one single injection operation using only one or few more injection points.

By means of the features of claim 2, also the apertures in the housing are closed tight, through which apertures an electric switch situated in the housing and a mechanical actuating means can be operated from outside with ease at a later stage. In addition to producing the vibration and sound absorbing effect, this arrangement enables a perfectly tight household appliance to be obtained, with the hardness value of the second plastic material being selected so low as to enable it to be deformed readily with comparatively little effort. Using an elastic second plastic material, a diaphragm closing an aperture can be pushed in elastically using a radial motion of a user's hand, such as to cause actuation of a component situated in the interior of the housing in the proximity of the diaphragm.

The second area of the wall is identical in form with the associated aperture and is in its entirety formed of the second plastic material, as a result of which the diaphragm bounded by the edge of the aperture and held in sealing engagement therewith is obtained, closing the aperture completely relative to the outside. However, it can also be considered to provide the diaphragm with an opening through which an actuating member arranged in the housing extends, the actuating member being then sealingly enclosed by the opening. In its inner area, the diaphragm may be thinner than the normal, rigid wall of the housing, whereby its flexibility is increased.

Advantageously, the connecting areas provided on the wall inner surface are configured as a coat covering the inner surface at least partially. There are practically no limits as regards the specific manner in which the connecting areas may be configured. Their configuration may be suitably adapted to meet the individual requirements. Also, these connecting areas which are coated with the second plastic material may serve a sound-insulating function in addition to the first areas, attenuating noise as from a motor or a transmission device, so that such noise is dampened when reaching the outside. Further, the coat thickness of the second plastic material covering the inner surface may be variable, so that, in the use of an elastic second plastic material, the connecting areas employed as a spring means, for example, serve to elastically support built-in components. These connecting areas may also be configured in a special fashion adapted for their individual uses in order to compensate for tolerances and thermal expansion.

The second elastic plastic material, in addition to serving as a vibration-absorbing, supporting and visual means, also serves as a sealing means. In lieu of the diaphragm, it is also possible to inject a plug serving only a sealing function into the aperture which then serves only an assembly purpose. Because the diaphragm is connected with the bearing areas through connecting areas, these can be molded with particular ease in a single operation when the second plastic material is applied to the housing. In this arrangement, the apertures also serve for conveying the second plastic material from the inner surface to the outer surface of the housing. However, conveying the second plastic material from the inner surface to the outer surface of the housing on its ends may also be contemplated.

With the features of patent claim 3, the individual actuating surfaces on the second plastic material may be identified particularly readily, enabling an operator to locate the proper point of actuation or pressure application with particular ease. This feature may be enhanced still further by providing the second plastic material with an increased grip, making it possible to probe this point more easily.

In accordance with the further features of patent claim 4, it is possible to provide, in addition to a diaphragm or a plug closing an aperture, further areas on the outer surface of the housing with the second plastic material, whereby, for example, an improved manipulation and grip of an appliance may be accomplished. Being of suitable shape, color, roughness, this third area may also contribute to the outer appearance of the housing.

According to the features of claim 5, the third area is equally made more prominent by a raised or recessed contact surface, enabling it to be located more easily.

The features of patent claim 6 result in a particularly large surface area over which the second plastic material is bonded to the first plastic material, thus increasing the wear resistance of the diaphragm in the transition area.

According to the features of patent claim 7, the second plastic material is deposited in a groove, a bead or the like, allowing in particular the arrangement of gripping ribs molded onto the outer surface which are then not required to project from the outer surface of the housing provided with the first plastic material, while being conducive to improving, for example, the grip of the housing. To this effect, the second plastic material is employed which has preferably a higher coefficient of friction and a lower hardness than the first plastic material. If, further, the second plastic material differs in color from the first plastic material, areas having an aesthetic or informative value may be provided, including, for example, areas with symbols, handling instructions, or areas with a different design. The upper side of the second plastic material may protrude from the outer surface of the housing or, alternatively, it may lie within the groove, that is, below the outer surface of the housing.

According to the features of patent claim 8, such thickened or raised portions may serve as supports for placing the personal-use appliance down. Provided that the second plastic material is soft, the thickened portions are capable of ensuring that the appliance can be placed down gently without noise. When the second plastic material has, for example, a high coefficient of friction, this has the added effect of preventing the appliance from sliding and slipping on the surface which supports it.

In accordance with the further features disclosed in patent claim 9, bearing surfaces fabricated from the second plastic material may be molded also onto the ends of the housing, the bearing surfaces cooperating with like mating surfaces of a further housing to provide a tightly sealed unit. This fourth area avoids additional seals between two housing parts, in addition to simplifying the assembly.

According to the features of patent claim 10, a particularly intimate connection adhering well is accomplished between the first and the second plastic material. The features of patent claim 11 disclose an adhesive bonding in combination with a fusing together of the first and the second plastic material in the surface area. Not only is this connection made to last, it is also perfectly tight. The thermoplastic elastomer is so fluid that it flows into the areas intended for the injection-molding operation, bonds intimately with the first plastic material, and hardens subsequently as it cools.

An embodiment of the present invention will now be described in more detail in the following with reference to the accompanying drawings. In the drawings, FIG. 1 is a longitudinal sectional view of a housing of the present invention;

Figure 1:
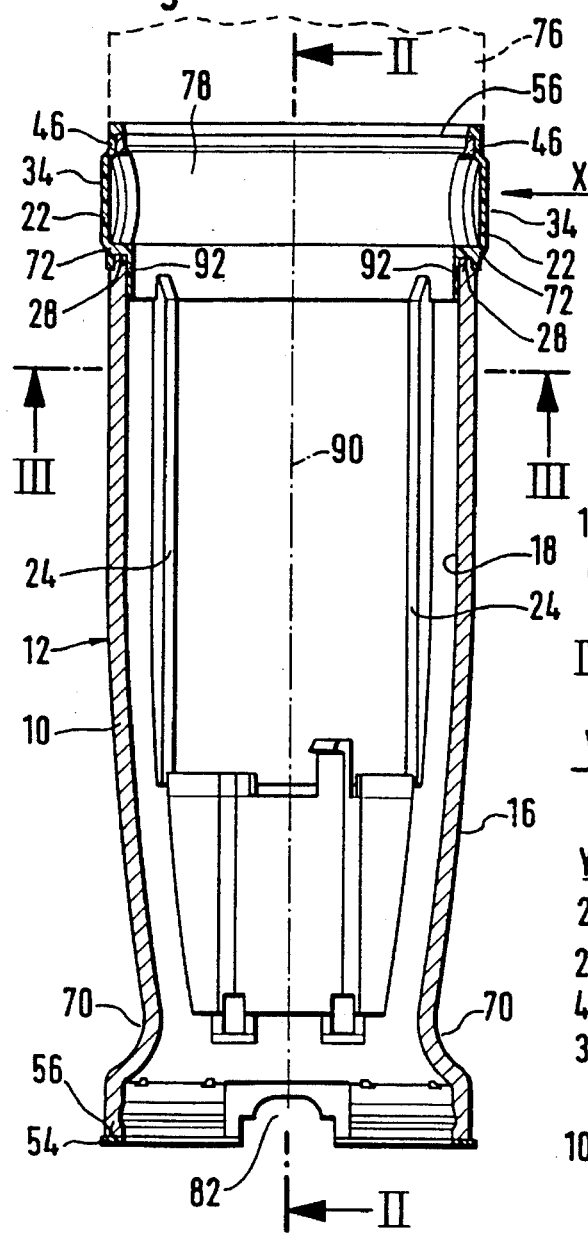
Figure 2:
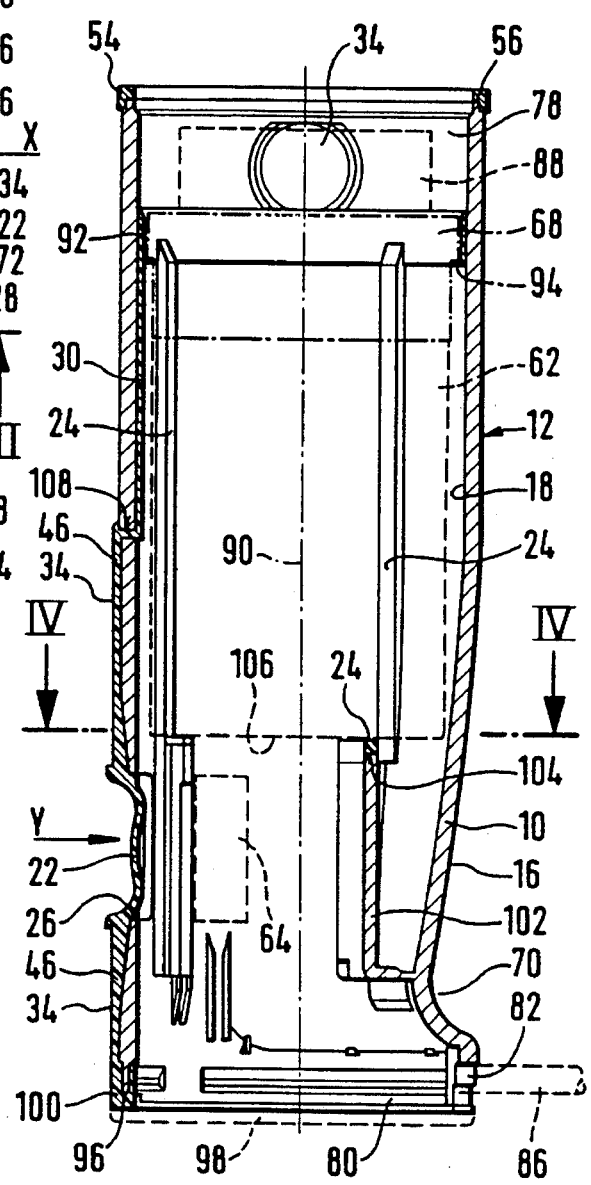
FIG. 2 is a longitudinal sectional view taken along the line II—II of FIG. 2.
Figure 3:
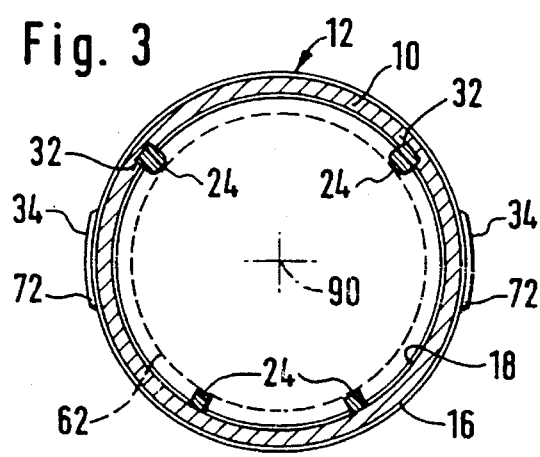
FIG. 3 is a cross-sectional view of the housing, taken along the line III—III of FIG. 1.

In FIGS. 1 to 4, a housing 12 is shown which extends longitudinally in the manner of a circular cylinder and serves to accommodate and mount therein an electric motor 62 shown only in broken lines in FIGS. 2 and 3 because the motor is not a component part of the housing 12. Adjoining the electric motor 62 in upward direction is a transmission device 68 shown only in dot-and-dash lines in FIG. 2. The transmission device 68 includes a coupling arrangement not shown in the drawings which is adapted to be coupled to a drive shaft of a processing implement (not shown).

The housing 12 illustrated in FIGS. 1 and 2 is placed upside down so that the opening 78 in the upper section serves to receive a shank 76 provided with a processing implement of a hand-held blender, while the opening 80 formed in the lower section serves to receive a cap 98 closing the housing 12 from that end. A passageway 82 laterally adjacent to the opening 80 serves for passage of an electrical cord 86 (shown in broken lines) to be connected to the housing.

A hand-held blender being known from DE-A-24 29 056, its basic structure is equally applicable to the housing illustrated in FIGS. 1 to 4. However, the housing 12 of the present invention is formed as an integral part, so that it is accessible from the top through the opening 78 and from the bottom through the opening 80 for the purpose of mounting in the housing 12 components such as electric motor 62, transmission device 68, electric switch 64, cord 86 and release device 88.

The housing 12 includes a circular cylindrical wall 10 having an outer surface 16 and an inner surface 18. Formed in the lower section of the housing 12 is a recessed grip 70 which serves to hold and guide the handheld blender while in operation. The wall 10 is made of a first, preferably rigid plastic material as, for example, polypropylene, shown in single hatched lines in the drawings. The housing 12 further includes areas 22, 24, 46, 54 applied by a hot-spraying operation using a second plastic material, preferably a thermoplastic elastomer adapted to the molecular structure of polypropylene, which second plastic material is shown in crosshatched lines at the appropriate locations in the drawings. The properties of the second plastic material differ from those of the first plastic material in color, hardness or coefficient of friction, for example.

Formed on the inner surface 18 of the housing 12 in the upper section lengthwise of the center line 90 are recesses 32 in the form of grooves into which the second plastic material is injected as the first area 24 in the form of ribs. The ribs 24 project radially inwardly from the inner surface 18 and serve as bearing areas 24 for the electric motor 62. Opposite the two upper ribs 24 in the lower section when viewing FIG. 3 are two further ribs 24 directly molded onto the inner surface 18 and projecting equally radially inwardly to such an extent that their bearing areas 24 are biased into engagement with the outer surface of the electric motor 62. Thus, as appears clearly from FIG. 3, the bearing areas 24 may be formed either by injecting the plastic into the recesses 32 configured as grooves or beads, or by molding the plastic directly onto the surface, that is, the inner surface 18.

According to FIGS. 1 and 2, diametrically opposite apertures 28 in the form of bores are provided at the upper opening 78 in the wall 10 of the housing 12, with the second plastic material spanning said apertures as the second area 22, thereby sealing the apertures 28 tight. The second area 22 includes each a circular thickened portion 72 whose outside serves as a gripping surface 34. The second area 22 being intimately connected with the edge of the aperture 28 all-round, a flexible diaphragm is obtained which, on the application of manual pressure from outside in the direction of arrow X, causes it to deform radially in the direction of the center line 90, such as to enable the actuating slides (not shown) provided on the release device 88 (shown in broken lines) to be displaced, as a result of which the shank provided with the processing implement may be detached from the motor housing 12. The latter parts are, however, not shown in the Figures.

The second area 22 is surrounded by a third area 46 and integrally formed therewith. A small distance below the second area 22, said third area extends as a thickened annular bead 92 along the wall inner surface 18, said bead serving to receive and centrally locate the transmission device 68 in pressure-tight engagement therewith, which transmission device increases in diameter slightly in this area through the annular shoulder 94.

Arranged on the housing 12 are the two diametrically opposite gripping surfaces 34 surrounded by the third area 46 which also covers the end 56 of the housing 12 in the manner of a ring, resulting at this location in a fourth area 54 which serves the function of a sealing lip equally in tight engagement with the end 56.

Spaced 90 degrees from the gripping surfaces 34, a further aperture 26 is provided in the lower left-hand section of the wall 10 when viewing FIG. 2, which aperture is equally closed by a second area 22 providing, as described in the foregoing, a flexible diaphragm behind which an electric switch 64 is situated in the interior of the housing 12, said switch being actuated on deformation of the diaphragm as a result of pressure application in the direction of arrow Y. The second raised area 22 is likewise surrounded by the third area 46 which, however, is not in connection with the third area 46 that surrounds the gripping surfaces 34. Also this third area 46 is integrally formed with the second area 22. Here, too, the third area 46 protrudes over the lower end 96, covering it all-round except for the passageway 82. To close the opening 80, a cap 98 is employed shown only in broken lines in the Figure and being in sealing engagement with the annular area 100 of the second plastic material abutting the end 96.

Figure 4:
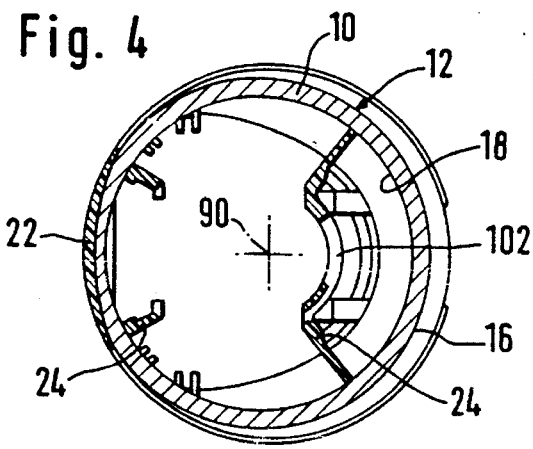
FIG. 4 is a cross-sectional view of the housing, taken along the line IV—IV of FIG. 1.

As becomes further apparent from FIGS. 2 and 4, rib or land members 102 are formed on the wall 10 in the interior of the housing 12, with the second plastic material being equally molded onto the rib or land ends 104 extending in the direction of the opening 78, said second plastic material providing the first area 24 integrally formed with the rib members 24 extending lengthwise of the center line 90 through the inner surface 18. The first areas 24 provided on the ends 104 serve as bearings for the lower end 106 of the electric motor 62, so that the electric motor 62 bears against the first areas 24 in both axial and radial direction free from vibration, being held in this position in frictional engagement therewith without requiring any additional fastening means. This arrangement results in a household appliance running at a particularly low noise level and low vibration.

According to FIG. 2, the second area 22 is connected, through the third area 46, with a connecting area 30 that is molded onto the wall inner surface 18 and establishes in turn the connection with the annular bead 92. For this purpose, the wall 10 of the housing 12 includes a bore 108 through which the second plastic material is allowed to flow from the inner surface 18 to the outer surface 16. Thus, according to the present invention, all areas 22, 24, 46, 54 may be connected with each other through connecting areas 30. However, it also envisaged within the scope of the present invention that the second plastic material molded onto the housing 12 in the upper and lower section may be not interconnected.

After injection-molding the housing 12 using the first plastic material, the housing 12 is placed in a second injection mold (not shown) in which cavities are formed with the housing 12 at those locations where a second plastic material is to be deposited. Then a thermoplastic elastomer heated to a temperature of between 80° and 90° which in this state has a viscosity approaching that of water, is injected into the injection mold (not shown) through special nozzles, the thermoplastic elastomer then flowing into the cavities, filling them. By virtue of the relatively high temperature of the elastomer and the fact that this thermoplastic elastomer carrying the trade name "Thermoflex" (TPE) corresponds in its molecular structure to the first plastic material, which is polypropylene, this thermoplastic elastomer enters a particularly intimate connection with the surface of the first plastic material, causing it to be virtually vulcanized, adhesively bonded or nearly welded to the surface of the first plastic material. After the thermoplastic elastomer is allowed to cool, the housing 12 may be withdrawn from the second injection mold. With this second injection operation, a housing is obtained which affords particular ease of manufacture while yet being suitable for performing a wide variety of functions.

We claim:

1. A housing for an electrically powered appliance for personal use for accommodating drive and switching means, said housing comprising a wall fabricated from a first plastic material having at least one outer surface and one inner surface, and also comprising at least one second plastic material of a hardness lower than the hardness of the first plastic material provided on at least one area of the wall, wherein the second plastic material is molded onto the inner surface of the wall, such that a first area of said at least one area projects from the inner surface of the wall at least in individual sections forming bearing areas structured to serve as supports for components mountable in the interior of the housing, wherein at least one connecting area formed by the second plastic material extends from at least one of the bearing areas, said connecting area terminating in at least one aperture in the wall, and wherein the aperture in the wall is closed tight by the second plastic material in the form of a diaphragm providing a second area of said at least one area.

2. A housing as claimed in claim 1, wherein the diaphragm is at least one of raised and recessed relative to the outer surface of the housing fabricated from the first plastic material.

3. A housing as claimed in claim 1, wherein the second plastic material is also molded onto the outer surface, providing a third area of said at least one area.

4. A housing as claimed in claim 3, wherein, in the third area on the outer surface, the second plastic material is deposited as a gripping surface that is at least one of raised and recessed relative to the outer surface.

5. A housing as claimed in claim 4, wherein the third area surrounds the second area all-round and is integrally formed therewith.

6. A housing as claimed in claim 3, wherein the second plastic material of the first and third areas is injected into recesses that are formed on the inner and outer surface, respectively.

7. A housing as claimed in claim 3, wherein a portion being one of thickened and raised is provided on the outer surface in the third area.

8. A housing as claimed in claim 1, wherein a fourth area of said at least one area fabricated from the second plastic material in the form of a strip is molded onto an end of the housing to serve as a sealed bearing surface for a further housing part.

9. A housing as claimed in any one of the preceding claims, wherein the first and the second plastic material are connected with each other by at least one of blending and fusing together.

10. A housing for an electrically powered appliance for personal use for accommodating drive and switching means, said housing comprising a wall fabricated from a first plastic material having at least one outer surface and one inner surface, and also comprising a second plastic material of a hardness lower than the hardness of the first plastic material provided on at least one area of the wall, wherein the second plastic material is molded onto the inner surface of the wall, such that a first area of said at least one area projects from the inner surface at least in individual sections forming bearing areas structured to serve as supports for components mountable in the interior of the housing, wherein the first plastic material of the housing is polypropylene, the second plastic material includes a thermoplastic elastomer corresponding in its molecular structure to polypropylene, and the thermoplastic elastomer is injection-molded onto partial areas of at least one of the inner surface, the outer surface and the end of the housing at a temperature in a range of about 70° C. to 130° C.

11. The housing of claim 1, wherein the bearing areas are structured in the form of at least one of strips, projections and rib members.

12. The housing of claim 6, wherein the recesses are structured in the form of at least one of a groove and a bead.

13. The housing of claim 10, wherein the polypropylene comprises at least one of thermoflex and thermoplast.

14. The housing of claim 10, wherein the thermoplastic elastomer is injection-molded at a temperature in a range of about 80° C. to 90° C.

* * * * *

UNITED STATES PATENT AND TRADEMARK OFFICE
CERTIFICATE OF CORRECTION

PATENT NO.   : 5,574,253

DATED        : November 12, 1996

INVENTOR(S)  : Jurgen Golob, Antonio Rebordosa

It is certified that error appears in the above-identified patent and that said Letters Patent is hereby corrected as shown below:

Col. 1, l. 23, "protections" should be --projections--.

Col. 7, l. 18, "4" should be --3--.

Signed and Sealed this

Twentieth Day of October, 1998

*Attest:*

BRUCE LEHMAN

*Attesting Officer*   *Commissioner of Patents and Trademarks*